United States Patent
Inagaki et al.

(10) Patent No.: US 9,392,063 B2
(45) Date of Patent: Jul. 12, 2016

(54) INFORMATION PROCESSING APPARATUS THAT CONTROLS TRANSFER OF IMAGE, CONTROL METHOD THEREFOR, AND STORAGE MEDIUM

(71) Applicant: CANON KABUSHIKI KAISHA, Tokyo (JP)

(72) Inventors: Kensuke Inagaki, Tokyo (JP); Kazuhiro Monden, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/508,125

(22) Filed: Oct. 7, 2014

(65) Prior Publication Data

US 2015/0099492 A1   Apr. 9, 2015

(30) Foreign Application Priority Data

Oct. 9, 2013   (JP) ................................ 2013-212078

(51) Int. Cl.
*H04M 11/10* (2006.01)
*H04L 29/08* (2006.01)
*H04L 29/06* (2006.01)

(52) U.S. Cl.
CPC ............ *H04L 67/12* (2013.01); *H04L 65/1083* (2013.01); *H04L 65/4092* (2013.01); *H04L 65/605* (2013.01); *H04L 67/303* (2013.01)

(58) Field of Classification Search
CPC . H04L 67/12; H04L 65/1083; H04L 65/4092; H04L 65/605
USPC .......................... 455/414.1, 414.2, 457, 412.1
See application file for complete search history.

(56) References Cited

U.S. PATENT DOCUMENTS

| | | | | |
|---|---|---|---|---|
| 6,101,526 A * | 8/2000 | Mochizuki | .......... | H04L 12/5835 358/402 |
| 6,246,487 B1 * | 6/2001 | Kobayashi | ............ | G06F 3/1297 358/1.13 |
| 6,941,385 B2 * | 9/2005 | Ishihara | .................. | H04L 67/42 709/203 |
| 6,996,417 B2 * | 2/2006 | Ono | ........................ | H04W 4/18 455/410 |
| 2002/0083192 A1 * | 6/2002 | Alisuag | .................. | G06F 19/322 709/237 |
| 2010/0296509 A1 * | 11/2010 | Roberts | ............... | G06F 9/44526 370/352 |
| 2011/0191812 A1 * | 8/2011 | Cory | ...................... | H04N 7/173 725/109 |

FOREIGN PATENT DOCUMENTS

JP           2006295965 A      10/2006

* cited by examiner

*Primary Examiner* — Qutbuddin Ghulamali
(74) *Attorney, Agent, or Firm* — Rossi, Kimms & McDowell LLP

(57) ABSTRACT

An information processing apparatus controls image transfer to display an image by projection while making full use of a screen resolution of an external display device without requiring a user to take time and trouble. A server sends a plurality of contents including a first and second content differing in amount of information and associated with each other. To request any one of the contents with the external display device not connected, the server is notified of information for receiving the first content, and to request the content with the external display device connected, the server is not notified of the information. In a case where a state of connection with the external display device changes while the content is displayed, the content is requested from the server again, which determines whether to notify the server of the information in accordance with the state of connection after the change.

13 Claims, 7 Drawing Sheets

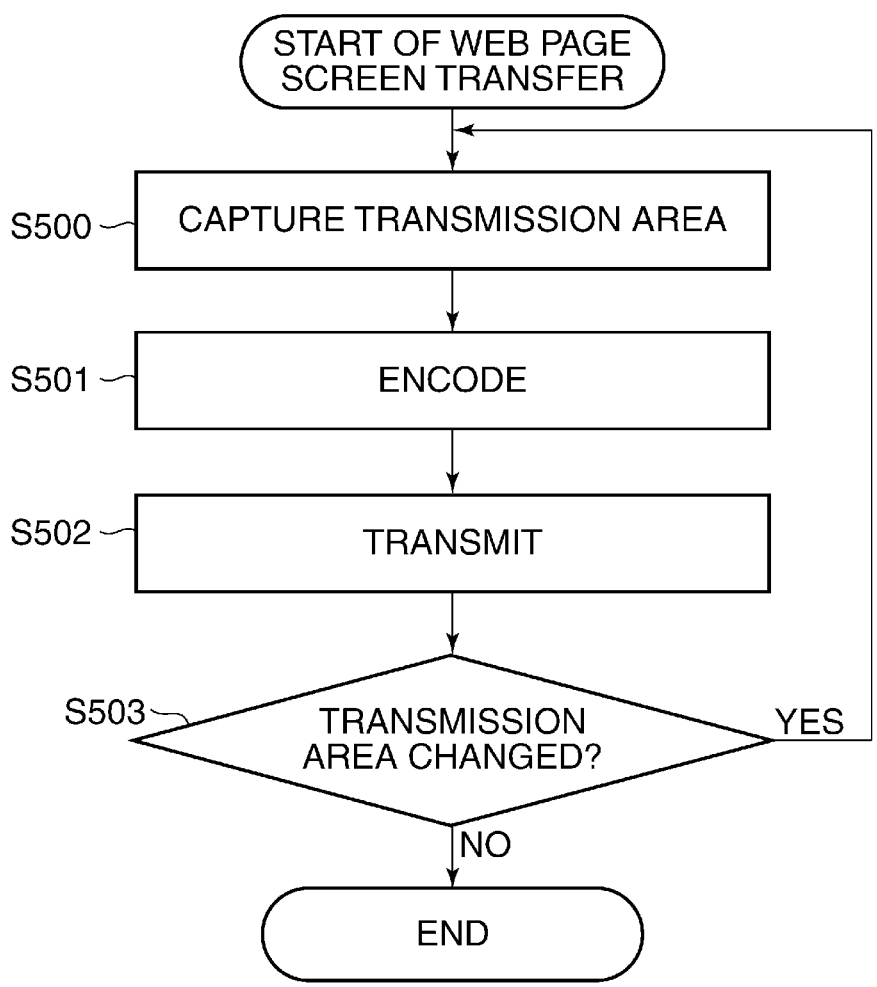

INFORMATION PROCESSING APPARATUS THAT CONTROLS TRANSFER OF IMAGE, CONTROL METHOD THEREFOR, AND STORAGE MEDIUM

This application incorporates by reference and claims the benefit of priority to Japanese Patent Application No. 2013-212078, filed Oct. 9, 2013.

BACKGROUND OF THE INVENTION

1. Field of the Invention

The present invention relates to an information processing apparatus, a control method therefor, and a storage medium, and in particular to transfer control performed to transfer an image generated by an information processing apparatus such as a personal computer (hereafter referred to as a PC) to an external display device such as a projector.

2. Description of the Related Art

In general, when transferring an image from an information processing apparatus to an external display device such as a projector, an analog connection using an analog RGB cable is used. On the other hand, establishing an analog connection is not only time-consuming, but also difficult when an information processing apparatus and an external display device are placed far away from each other. Further, there is a demand to connect a plurality of information processing apparatuses to an external display device. For these reasons, there has been known a so-called network screen transfer system which connects an information processing apparatus and an external display device to each other via a network.

In the network screen transfer system, a screen displayed on a display unit such as a monitor, which an information processing apparatus has, is subjected to so-called screen capture by the information processing apparatus on a regular basis, and image data obtained by screen capture is transmitted to an external display device.

Here, a cellular phone is taken as an exemplary information processing apparatus. The cellular phone has a Web browser as standard equipment so that Web pages can be browsed using a network infrastructure such as a telephone line or a wireless LAN. In recent years, due to increase of Web browsing using cellular phones, Web pages for cellular phones as well as Web pages for PCs are provided in sources of Web pages.

On Web pages for cellular phones, the number of contents is limited as compared to Web pages for PCs, and further, twists are added with consideration given to characteristics of cellular phones such as layouts appropriate to operation on touch panels which cellular phone are equipped with in many cases.

On the other hand, there has been known a system that displays a screen, which is being displayed on a cellular phone, on an external display so as to circumvent a limit placed by a small screen of a cellular phone, so that even Web pages for PCs can be browsed using a cellular phone in a comfortable way (see Japanese Laid-Open Patent Publication (Kokai) No. 2006-295965).

According to Japanese Laid-Open Patent Publication (Kokai) No. 2006-295965, however, no consideration is given to a case where a screen is transferred from a cellular phone to another display device. For example, when a Web page screen for cellular phones which is being displayed on a cellular phone is transferred to an external display device such as a projector, the Web page screen for cellular phones which is being displayed on the cellular phone is displayed on the projector. In this case, a displayable screen resolution of the projector cannot be fully used, and a user who sees a projection surface of the projector with his/her eyes feels that the amount of information on the projection surface is not sufficient.

FIG. 7 is a view which is useful in explaining a conventional network screen transfer system.

In the network screen transfer system shown in the figure, a PC 702 and a smartphone 703, which is an exemplary cellular phone, are connected to a Web server 701 via a network. Here, the Web server 701 transmits a Web page for PCs to the PC 702, and as a result, the Web page for PCs can be browsed on the PC 702. On the other hand, the Web server 701 transmits a Web page for smartphones to the smartphone 703, and as a result, the Web page for smartphones can be browsed on the smartphone 703.

As shown in the figure, projectors 704 and 705 which are external display devices are connected to the PC 702 and the smartphone 703, respectively, via wireless lines. When a Web page for PCs obtained by the PC 702 is transferred to the projector 704 and displayed by projection, a projection screen 706 is displayed. Because the screen resolution of a Web page for PCs is high, the projection screen 706 is projected using the whole projection surface, and hence the projection surface of the projector can be fully used.

On the other hand, when a Web page for smartphones obtained by the smartphone 702 is transferred to the projector 705 and displayed by projection, a projection screen 707 is displayed. Because the screen resolution of a Web page for smartphones is low, the projection screen 707 is projected on part of a projection surface (central part of the projection surface), and hence the projection surface of the projector cannot be fully used.

SUMMARY OF THE INVENTION

The present invention provides an information processing apparatus and a control method that control image transfer so as to display an image by projection while making full use of a screen resolution of an external display device without requiring a user to take time and trouble, as well as a computer-readable storage medium storing a program for implementing the control method.

Accordingly, a first aspect of the present invention provides an information processing apparatus which is a mobile device connectable to an external display device, comprising a requesting unit configured to request, from a server capable of sending a plurality of contents including a first content and a second content differing in the amount of information and associated with each other, any one of the plurality of contents, the second content being larger than the first content in the amount of information, a receiving unit configured to receive the content transmitted from the server in response to the request from the requesting unit, a display unit configured to display the content received by the receiving unit, a transmission unit configured to transmit display data based on the content received by the receiving unit to the external display device, wherein in a case where requesting the content from the server in a state in which the information processing apparatus is not connected to the external display device, the requesting unit notifies the server of information for receiving the first content, in a case where requesting the content from the server in a state in which the information processing apparatus is connected to the external display device, the requesting unit does not notify the server of the information for receiving the first content, and in a case where a state of connection with the external display device changes while the content received from the server is being displayed on the display unit, the requesting unit requests the content from the server again, and in accordance with the state of connection after the change, determines whether to notify the server of the information for receiving the first content.

Accordingly, a second aspect of the present invention provides an information processing apparatus which is a mobile device connectable to an external display device, comprising a requesting unit configured to request, from a server capable of sending a plurality of contents including a first content and a second content differing in display layout and associated with each other, any one of the plurality of contents, a receiving unit configured to receive the content transmitted from the server in response to the request from the requesting unit, a display unit configured to display the content received by the receiving unit, a transmission unit configured to transmit display data based on the content received by the receiving unit to the external display device, wherein in a case where requesting the content from the server in a state in which the information processing apparatus is not connected to the external display device, the requesting unit notifies the server of first information for receiving the first content, in a case where requesting the content from the server in a state in which the information processing apparatus is connected to the external display device, the requesting unit notifies the server of second information for receiving the second content, and in a case where a state of connection with the external display device changes, the requesting unit requests the content from the server again, and in accordance with the state of connection after the change, determines whether to notify the server of the first information for receiving the first content or notify the server of the second information for receiving the second content.

Accordingly, a third aspect of the present invention provides a control method for an information processing apparatus which is a mobile device connectable to an external display device, comprising a requesting step of requesting, from a server capable of sending a plurality of contents including a first content and a second content differing in the amount of information and associated with each other, any one of the plurality of contents, the second content being larger than the first content in the amount of information, a receiving step of receiving the content transmitted from the server in response to the request in the requesting step, a display step of displaying the content received in the receiving step on a display unit, a transmission step of transmitting display data based on the content received in the receiving step to the external display device, wherein in a case where requesting the content from the server in a state in which the information processing apparatus is not connected to the external display device, the server is notified of information for receiving the first content in the requesting step, in a case where requesting the content from the server in a state in which the information processing apparatus is connected to the external display device, the server is not notified of the information for receiving the first content in the requesting step, and in a case where a state of connection with the external display device changes while the content received from the server is being displayed on the display unit, the content is requested from the server again in the requesting step, and in accordance with the state of connection after the change, it is determined whether to notify the server of the information for receiving the first content.

Accordingly, a fourth aspect of the present invention provides a non-transitory computer-readable storage medium storing a program for causing a computer to execute a control method for an information processing apparatus which is a mobile device connectable to an external display device, the control method comprising a requesting step of requesting, from a server capable of sending a plurality of contents including a first content and a second content differing in the amount of information and associated with each other, any one of the plurality of contents, the second content being larger than the first content in the amount of information, a receiving step of receiving the content transmitted from the server in response to the request in the requesting step, a display step of displaying the content received in the receiving step on a display unit, a transmission step of transmitting display data based on the content received in the receiving step to the external display device, wherein in a case where requesting the content from the server in a state in which the information processing apparatus is not connected to the external display device, the server is notified of information for receiving the first content in the requesting step, in a case where requesting the content from the server in a state in which the information processing apparatus is connected to the external display device, the server is not notified of the information for receiving the first content in the requesting step, and in a case where a state of connection with the external display device changes while the content received from the server is being displayed on the display unit, the content is requested from the server again in the requesting step, and in accordance with the state of connection after the change, it is determined whether to notify the server of the information for receiving the first content.

Accordingly, a fifth aspect of the present invention provides a control method for an information processing apparatus which is a mobile device connectable to an external display device, comprising a requesting step of requesting, from a server capable of sending a plurality of contents including a first content and a second content differing in display layout and associated with each other, any one of the plurality of contents, a receiving step of receiving the content transmitted from the server in response to the request in the requesting step, a display step of displaying the content received in the receiving step, a transmission step of transmitting display data based on the content received in the receiving step to the external display device, wherein in a case where requesting the content from the server in a state in which the information processing apparatus is not connected to the external display device, the server is notified of first information for receiving the first content in the requesting step, in a case where requesting the content from the server in a state in which the information processing apparatus is connected to the external display device, the server is notified of second information for receiving the second content in the requesting step, and in a case where a state of connection with the external display device changes, the content is requested from the server again in the requesting step, and in accordance with the state of connection after the change, it is determined whether to notify the server of the first information for receiving the first content or notify the server of the second information for receiving the second content.

Accordingly, a sixth aspect of the present invention provides a non-transitory computer-readable storage medium storing a program for causing a computer to execute a control method for an information processing apparatus which is a mobile device connectable to an external display device, the control method comprising a requesting step of requesting, from a server capable of sending a plurality of contents including a first content and a second content differing in display layout and associated with each other, any one of the plurality of contents, a receiving step of receiving the content transmitted from the server in response to the request in the requesting step, a display step of displaying the content received in the receiving step, a transmission step of transmitting display data based on the content received in the receiving step to the external display device, wherein in a case where requesting the content from the server in a state in which the information processing apparatus is not connected to the external display device, the server is notified of first information for receiving the first content in the requesting step, in a case where requesting the content from the server in a state in which the information processing apparatus is connected to the external display device, the server is notified of second information for receiving the second content in the requesting step, and in a case where a state of connection with the external display device changes, the content is requested from the server again in the requesting step, and in accordance with the state of connection after the change, it is determined whether to notify the server of the first information for receiving the first content or notify the server of the second information for receiving the second content.

According to the present invention, to request one of the first content and the second content differing in the amount of information and associated with each other, the second content being larger than the first content in the amount of information, the server is notified of the information for receiving the first content when the external display device is not connected to the information processing apparatus, and on the other hand, the server is not notified of the information for receiving the first content when the external display device is connected to the information processing apparatus. When a state of connection with the external display device changes while the content received from the server is being displayed, the content is requested from the server again, and in accordance with the state of connection after the change, whether or not to notify the server of the information for receiving the first content is determined. As a result, whether to display the first content or the second content by projection on the external display device can be appropriately determined. Therefore, an image can be displayed by projection while making full use of a screen resolution of the external display device without requiring a user to take time and trouble.

Further features of the present invention will become apparent from the following description of exemplary embodiments (with reference to the attached drawings).

BRIEF DESCRIPTION OF THE DRAWINGS

FIG. 5 is a flowchart which is useful in explaining a Web page screen transfer process in step S303 in FIG. 3.

FIGS. 6A, 6B, and 6C are flowcharts which are useful in explaining a capturing process in step S500 in FIG. 5 and a transfer area change determination process in step S503 in FIG. 5, in which FIG. 6A shows a state in which the smartphone transfers a Web page for PCs to the projector and displays the same, FIG. 6B shows an exemplary state after a change in a transfer area, and FIG. 6C shows another exemplary state after a change in a transfer area.

DESCRIPTION OF THE EMBODIMENTS

A detailed description will now be given of an exemplary information processing apparatus according to an embodiment of the present invention.

Figure 1:
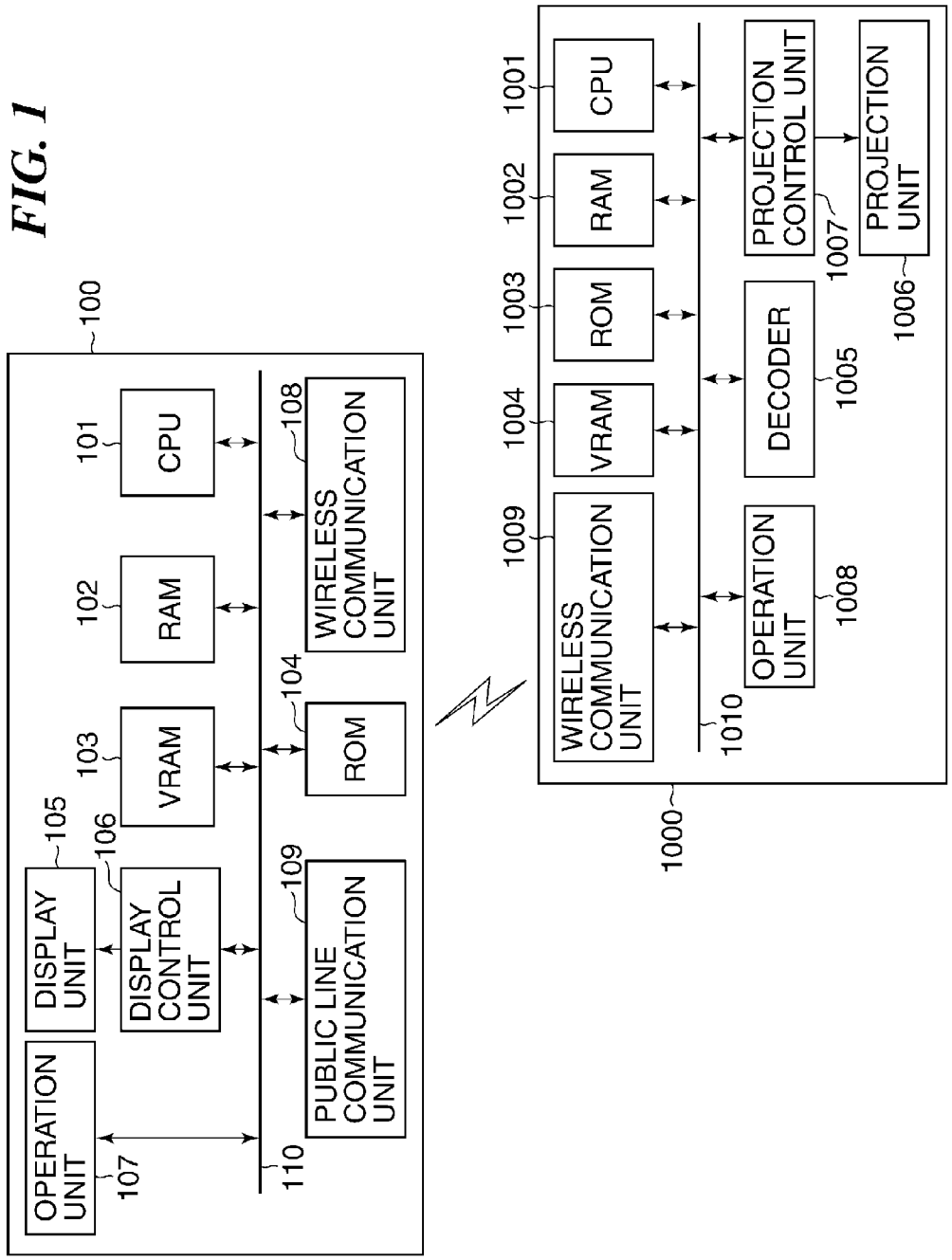
FIG. 1 is a block diagram showing an exemplary image transfer system in which an external display device is connected to an information processing apparatus according to an embodiment of the present invention.

FIG. 1 is a block diagram showing an exemplary image transfer system in which an external display device is connected to the information processing apparatus according to the embodiment of the present invention.

A smartphone 100 which is an information processing apparatus is wirelessly connectable to a projector 1000 which is an external display device. In the example shown in the figure, the smartphone 100 is connected to the projector 1000 via a wireless LAN to constitute a communication network. In the following description, the communication network shown in the figure is referred to as a screen transfer system. Here, the smartphone 100 captures a picture (also referred to as an image) displayed on a display unit (also referred to a display) 105 and transmits the captured picture as picture data to the projector 1000 via the wireless LAN. On the other hand, the projector 1000 projects the picture data, which has been received from the smartphone 100, as a picture on a projection surface.

The smartphone 100 shown in the figure has a CPU 101, a RAM 102, a VRAM 103, a ROM 104, a display control unit 106, an operation unit 107, a wireless communication unit 108, and a public line communication unit 109, and they are connected to one another via an internal bus 110. The display unit 105 is connected to the display control unit 106. The CPU 101 controls the overall operation of the smartphone 100. The RAM 102 is a main memory, and for example, storage areas for various types of data such as an area in which programs to be executed by the CPU 101 are stored or expanded and a work area for use during program execution are provided in the RAM 102.

The VRAM 103 is used as an area for storing pictures to be displayed on the display unit 105, to be described later. It should be noted that the VRAM 103 may be the same as the RAM 102 as long as the RAM 102 is capable of operating at satisfactorily high speed.

The ROM 104 is used to store data and various programs such as a boot program, application programs (such as a screen transfer application and a Web browser application, to be described later), and an operation system (OS). The display unit 105 displays a picture designated by the display control unit 106, to be described later. A liquid crystal panel or an organic EL panel, for example, is used as the display unit 105.

The display control unit 106 provides control to read out a picture recorded in the VRAM 103 and display the same on the display unit 105. The operation unit 107 receives input operations from a user. The operation unit 107 has, for example, operation buttons, a touch panel, and so on, and an input operation by the user is sent from the operation unit 107 to the CPU 101. It should be noted that in the smartphone 100, the touch panel is disposed on a liquid crystal panel.

The wireless communication unit 108 carries out wireless communications with an external apparatus, which is the projector 1000 here, via a wireless network (here, the wireless LAN). The wireless communication unit 108 has an antenna, an RF unit, and a baseband unit, which are not shown, and sends and receives packets conforming to standards for the wireless LAN.

It should be noted that both the smartphone 100 and the projector 1000 join a network generated by routers, which are so-called access points, to establish communication between the smartphone 100 and the projector 1000 via the access points. Alternatively, one of the smartphone 100 and the projector 1000 may have so-called access point functions incorporated therein to apparently perform one-on-one communication.

The public line communication unit 109 is an interface for use in carrying out public wireless communications. The smartphone 100 can realize calls to external devices via the public line communication unit 109. On this occasion, the CPU 101 inputs and outputs sound signals via a microphone and a speaker, not shown. It should be noted that when the projector 1000 as well is connectable to a public line, not the wireless communication unit 108 but the public line communication unit 109 may be used to connect the smartphone 100 and the projector 1000 to each other via the public line.

Moreover, according to the present embodiment, the smartphone 100 is capable of connecting to the Internet using the public line communication unit 109 and downloading a so-called Web page from a server on the Internet. This communication using the public line communication unit 109 may be performed in parallel with a communication using the wireless communication unit 108.

It should be noted that when access points generating a network which the smartphone 100 and the projector 1000 join have a gateway function (that is, when access to the Internet is possible), a Web page may be downloaded from a server on the Internet using the wireless communication unit 108.

The projector 1000 has a CPU 1001, a RAM 1002, a ROM 1003, a VRAM 1004, a decoder 1005, a projection control unit 1007, an operation unit 1008, and a wireless communication unit 1009, and they are connected to one another via an internal bus 1010. The projection unit 1006 is connected to the projection control unit 1007. The CPU 1001 controls the overall operation of the projector 1000. The RAM 1002 is a main memory, and for example, storage areas for various types of data such as an area in which programs to be executed by the CPU 1001 are stored or expanded and a work area for use during program execution are provided in the RAM 1002.

Programs, parameters, and so on for operation of the projector 1000 are recorded in advance in the ROM 1003, and the CPU 1001 operates in accordance with the programs recorded in the ROM 1003. The VRAM 1004 is used as an area for storing pictures which are to be projected by the projection unit 1006, to be described later.

When picture data received from the smartphone 100 is encoded using an encoding method such as JPEG, the decoder 1005 decodes the picture data into decoded picture data. The projection unit 1006 displays a picture designated by the projection control unit 1007, to be described later. The projection unit 1006 has, for example, a liquid crystal panel, a lens, and a light source.

The projection control unit 107 provides control to read out a picture recorded in the VRAM 1004 and projects the picture by the projection unit 1006. The operation unit 1008 receives input operations from a user. The operation unit 1008 has, for example, operation buttons and also has a remote control receiver that receives remote control operations by the user, and input operations by the user are sent from the operation unit 1008 to the CPU 1001.

The wireless communication unit 1009 carries out wireless communications with an external apparatus, which is the smartphone 100 here, via the wireless LAN. The wireless communication unit 1009 has an antenna, an RF unit, and a baseband unit, which are not shown, and sends and receives packets conforming to standards for the wireless LAN.

A description will now be given of normal operation in the screen transfer system described above. It should be noted that here, the wireless communication unit 108 and the wireless communication unit 1009 are already in a state of readiness to carry out two-way communications.

A description will now be given of normal operation of the smartphone 100. This normal operation is implemented by a program running on the CPU 101. It is assumed here that this program is a screen transfer application.

When the user issues a screen transfer starting instruction using the operation unit 107, the CPU 101 controls the display control unit 106 to capture an image being displayed on the display unit 105 (that is, image data) in response to the screen transfer starting instruction. The CPU 101 then transfers the image from the VRAM 103 to the RAM 102. Subsequently, the CPU 101 encodes the image data stored in the RAM 102 to obtain encoded image data for the screen transfer application. The CPU 101 then stores the encoded image data in the RAM 102.

An encoding method used here is, for example, JPEG encoding which is generally used for compressing image data. It should be noted that the encoding method is not limited to JPEG encoding, but any encoding method may be used as long as it enables decoding in the projector 1000.

The CPU 101 then controls the wireless communication unit 108 to send the encoded image data stored in the RAM 102 to the projector 1000. Until an instruction to stop screen transfer is issued by the user, the CPU 101 repeatedly carries out the capturing, encoding, and sending processes described above whenever it detects a change in the image being displayed on the display unit 105.

A description will now be given of normal operation of the projector 1000. This normal operation is implemented by a program running on the CPU 1001. It is assumed here that this program has already been started in response to an instruction from the user.

First, the CPU 1001 controls the wireless communication unit 1009 to bring the projector 1000 into a standby mode in which it is ready to receive encoded image data from the smartphone 100. When the wireless communication unit 1009 receives encoded image data from the smartphone 100, the CPU 1001 stores the encoded image data in the RAM 1002. The CPU 1001 then controls the decoder 1005 to carry out a decoding process on the encoded image data stored in the RAM 1002 and stores the resulting image data as decoded image data in the VRAM 1004. It should be noted that after the decoding process, the CPU 1001 may carry out a scaling process on the decoded image data to change the image size of the decoded image data to a predetermined display size.

Next, the CPU 1001 reads out then the decoded image data stored in the VRAM 1004 and causes the projection control unit 1007 to display an image, which corresponds to the decoded image data, on a projection surface (not shown) by projection from the projection unit 1006. Until termination of the screen transfer program is instructed or the power to the projector 1000 is turned off by user operation, the CPU 1001 repeatedly carries out the receiving, decoding, and projecting processes described above whenever it receives encoded image data from the smartphone 100.

A description will now be given of how a Web page is provided from a Web server to a personal computer (PC) and a smartphone when the PC and the smartphone access the Web server. It should be noted that the PC is an exemplary information processing apparatus.

Figure 2:
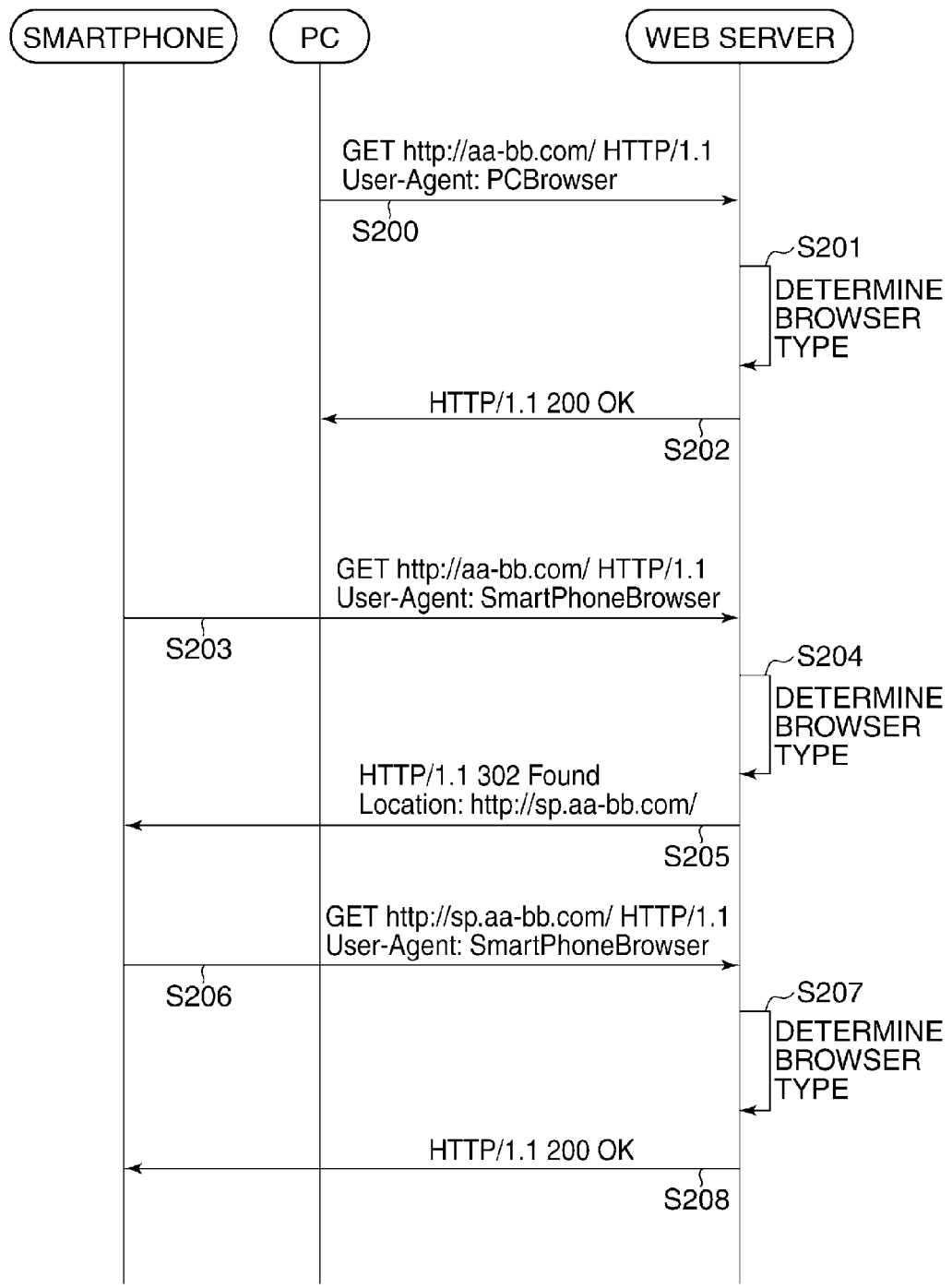
FIG. 2 is a view which is useful in explaining a process sequence for HTTP communication by a PC, a smartphone, and a Web server.

FIG. 2 is a view which is useful in explaining a process sequence for HTTP (Hypertext Transfer Protocol) communication by the PC, the smartphone, and the Web server. Here, the Web server provides a URL "http://aa-bb.com" as a URL of a Web page for PCs (a Web page with a predetermined resolution or higher), and provides a URL "http://sp.aa-bb.com" as a URL of a Web page for smartphones (a Web page with a resolution lower than the predetermined resolution). Namely, a plurality of contents which is the same in content but differs in the amount of information is provided in the Web server.

First, in step S200, the PC accesses the URL (http://aa-bb.com) using a Web browser application (hereafter referred to merely as a Web browser). Specifically, the Web browser of the PC issues an HTTP GET request (HTTP request) to the Web server and requests a Web page at the above URL.

The HTTP request includes a field called a message header, and information on the Web browser of the PC (Web browser information) which the Web server will be notified of is stored in this field. When the Web browser of the PC accesses the Web server, for example, type information showing that the Web browser is a Web browser of a PC (in FIG. 2, PCBrowser) is stored in a User-Agent header indicating a type of a Web browser in the message header.

Upon receiving the HTTP request, the Web server analyzes the User-Agent header in step S201 to determine whether or not the accessing Web browser is for PCs or for smartphones. Upon determining that the accessing Web browser is for PCs, the Web server sends back hypertext for the Web page as well as an HTTP response code of 200 (OK) to the PC in step S202.

Upon receiving hypertext for the Web page, the Web browser of the PC interprets hypertext and displays the Web page corresponding to hypertext on a display unit, not shown.

Next, in step S203, the smartphone accesses the URL (http://aa-bb.com) using a Web browser. Specifically, the Web browser of the smartphone issues an HTTP GET request (HTTP request) to the Web server and requests a Web page at the above URL. In this case, type information showing that the Web browser is a Web browser for smartphones (in FIG. 2, SmartPhoneBrowser) is stored in a User-Agent header.

Upon receiving the HTTP request, the Web server analyzes the User-Agent header in step S204 to determine whether or not the accessing Web browser is for PCs or for smartphones. Upon determining that the accessing Web browser is for smartphones, the Web server sends back the URL (http://sp.aa-bb.com) of the Web page for smartphones as a transfer destination as well as a transfer response which is an HTTP transfer response code of 302 to the smartphone in step S205.

Upon receiving the transfer response, the Web browser of the smartphone issues again a GET request (HTTP request) to the URL (http://sp.aa-bb.com) of the Web page designated as the transfer destination in step S206. Upon receiving the HTTP request, the Web server compares the User-Agent header with the URL to be accessed and determines a type of the accessing Web browser in step S207.

Here, in the Web server, the URL of the Web page for smartphones is accessed from the Web browser of the smartphone. Thus, the Web server sends back hypertext for the Web page as well as an HTTP response code of 200 (OK) to the smartphone in step S208.

Upon receiving hypertext for the Web page, the Web browser of the smartphone interprets hypertext and displays the Web page corresponding to hypertext on a display unit, not shown.

As described above, the web server determines a type of a Web browser according to a User-Agent header included in an HTTP request. Based on the determination result, the Web server determines whether to send back hypertext for a Web page corresponding to a URL to be accessed or a URL which is a transfer destination.

A description will now be given of how a Web page obtained from the Web server by the smartphone 100 in FIG. 1 is transferred to and displayed on the projector 1000 in FIG. 1.

Figure 3:
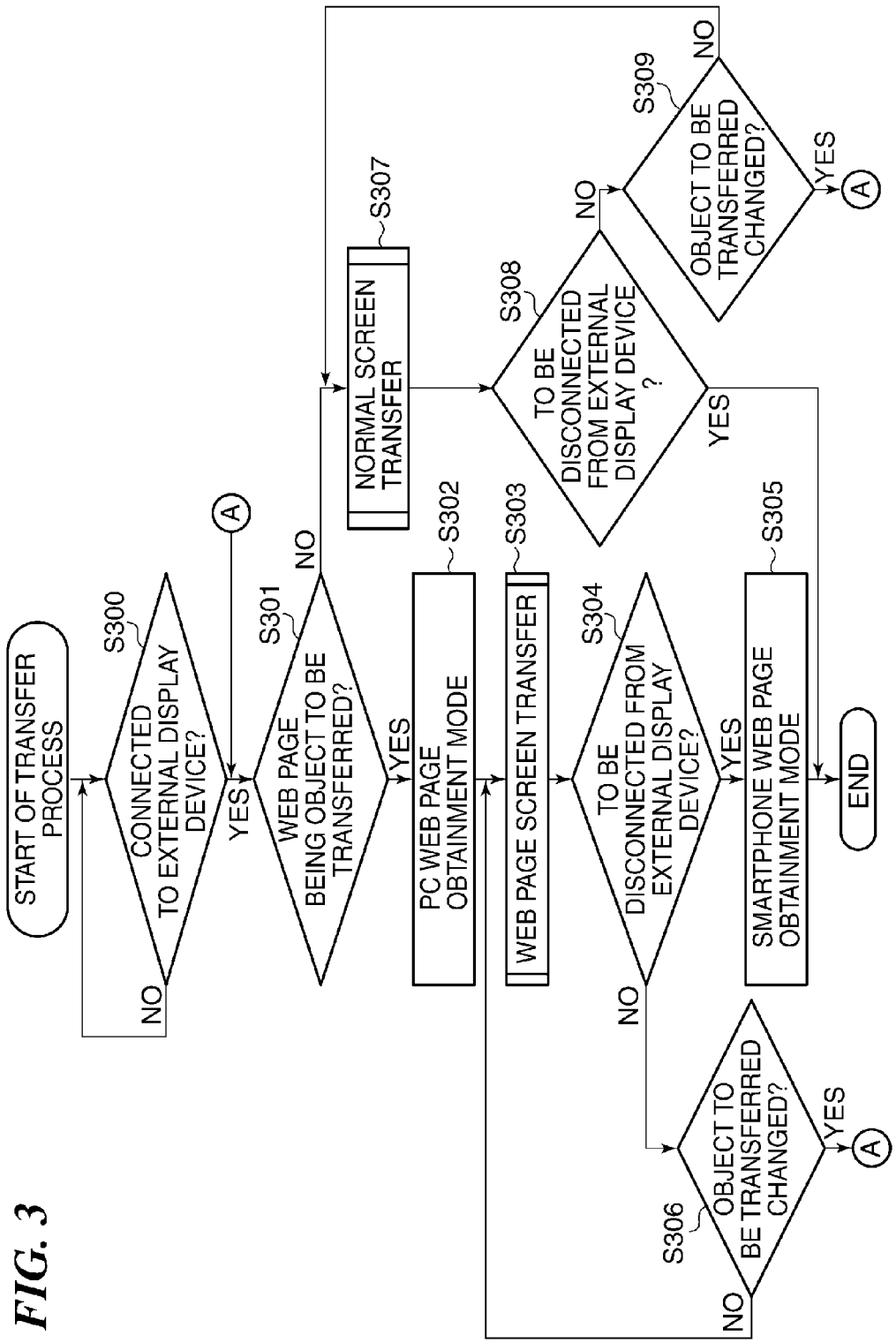
FIG. 3 is a flowchart which is useful in explaining a process in which an image is transferred from a smartphone in FIG. 1 to a projector in FIG. 1.

FIG. 3 is a flowchart which is useful in explaining a process in which an image is transferred from the smartphone 100 in FIG. 1 to the projector 1000 in FIG. 1. It should be noted that the process in the illustrated flowchart is carried out under the control of the CPU 101 provided in the smartphone 100 in FIG. 1.

It should be noted that a screen transfer application for carrying out the image transfer process is stored in the ROM 104, and when the screen transfer application is started in response to an instruction from the user, the screen transfer application is expanded on the RAM 102, and the CPU 101 starts a process according to the screen transfer application.

First, in step S300, the CPU 101 tries to wirelessly connect to the projector 1000 by controlling the wireless communication unit 108 in response to an instruction from the user. The CPU 101 then determines whether or not a wireless connection with the projector 1000 has been established.

In the projector 1000, the CPU 1001 causes the wireless communication unit 1009 to wait for a connection request from the smartphone 100. Upon receiving the connection request, the CPU 1001 causes the wireless communication unit 1009 to notify the projector 1000 that the connection request has been received. When the wireless connection has been established in response to the notification about the receipt of the connection request, the wireless communication unit 108 notifies the CPU 101 of an event. On the other hand, when the wireless connection has not been established, the CPU 101 repeatedly carries out the process in the step S300. It should be noted that the projector 1000 is determined as a destination by the user inputting an IP address of the projector 1000.

When the CPU 101 determines in the step S300 that the wireless connection has been established, the process proceeds to step S301. In the step S301, the CPU 101 determines whether or not a content (an image) being displayed on the display unit 105, that is, a content to be transferred is a Web page. When the CPU 101 determines that the content to be transferred is a Web page, the process proceeds to step S302.

In the step S302, the CPU 101 shifts from a smartphone Web page obtainment mode into a PC Web page obtainment mode and requests a PC Web page (a second content) from the Web server. For example, the CPU 101 issues a GET method of an HTTP request by using a User-Agent header stored in the HTTP request as a header of a Web browser for PCs.

It should be noted that although a User-Agent header for PCs is used here, any User-Agent header may be used as long as a Web page for PCs can be obtained. For example, no User-Agent header may be stored in an HTTP request so as to inhibit the Web server from recognizing that the party at the other end of connection is a smartphone, so that a PC Web page can be obtained from the Web server. When the Web browser of the smartphone 100 accesses a Web page while connecting with the projector 1000, a Web page for PCs is viewed with the smartphone 100 due to the shifting into the PC Web page obtainment mode.

Next, in step S303, the CPU 101 carries out a Web page screen transfer process, to be described later with reference to FIG. 5, in which it screen-transfers a Web page to the projector 1000. Then, in step S304, the CPU 101 determines whether or not disconnection from the projector 1000 (termination of screen transfer) has been requested by user operation.

When the CPU 101 determines that disconnection from the projector 1000 has been requested, the process proceeds to step S305. In the step S305, the CPU 101 shifts from the PC Web page obtainment mode into the smartphone Web page obtainment mode. The CPU 101 then quits the screen transfer application.

It should be noted that in the step S305, the CPU 101 enables issuance of a GET method of an HTTP request using a User-Agent header stored in the HTTP request as a header of a Web browser for smartphones. As a result of this process, when the Web browser of the smartphone 100 accesses a Web page after the connection with the projector 1000 is terminated, a Web page for smartphones (first content) can be viewed with the smartphone 100. It should be noted that the CPU 101 may automatically issue a GET method with the timing with the connection is terminated. In this case, the display unit 105 of the smartphone 100 is automatically updated to a smartphone Web page display.

On the other hand, when the CPU 101 determines in the step S304 that disconnection has not been requested, the process proceeds to step S306. In the step S306, the CPU 101 checks a content being displayed on the display unit 105 and determines whether or not an object to be transferred (content) has changed. When the CPU 101 determines that the object to be transferred has changed, the process returns to the step S301. On the other hand, when the CPU 101 determines that the object to be transferred has not changed, the process returns to the step S303. A change in the content here means that, for example, a link to a Web page is selected by user operation, and as a result, HTML data on the linked Web page is downloaded from a network to update display.

When the CPU 101 determines in the step S301 that the object to be transferred is not a Web page, the process proceeds to step S307. In the step S307, the CPU 101 carries out a normal screen transfer process, to be described later with reference to FIG. 4. Then, in the same manner as in the process in the step S304, the CPU 101 determines in step S308 whether or not disconnection from the projector 1000 has been requested.

Upon determining that disconnection from the projector 1000 has been requested, the CPU 101 then quits the screen transfer application. On the other hand, when the CPU 101 determines that disconnection from the projector 1000 has not been requested, the process proceeds to step S309.

In the same manner as in the process in the step S306, the CPU 101 determines in the step S309 whether or not the content which is the object to be transferred has changed. When the CPU 101 determines that the object to be transferred has changed, the process returns to the step S301. On the other hand, when the CPU 101 determines that the object to be transferred has not changed, the process returns to the step S307.

Figure 4:
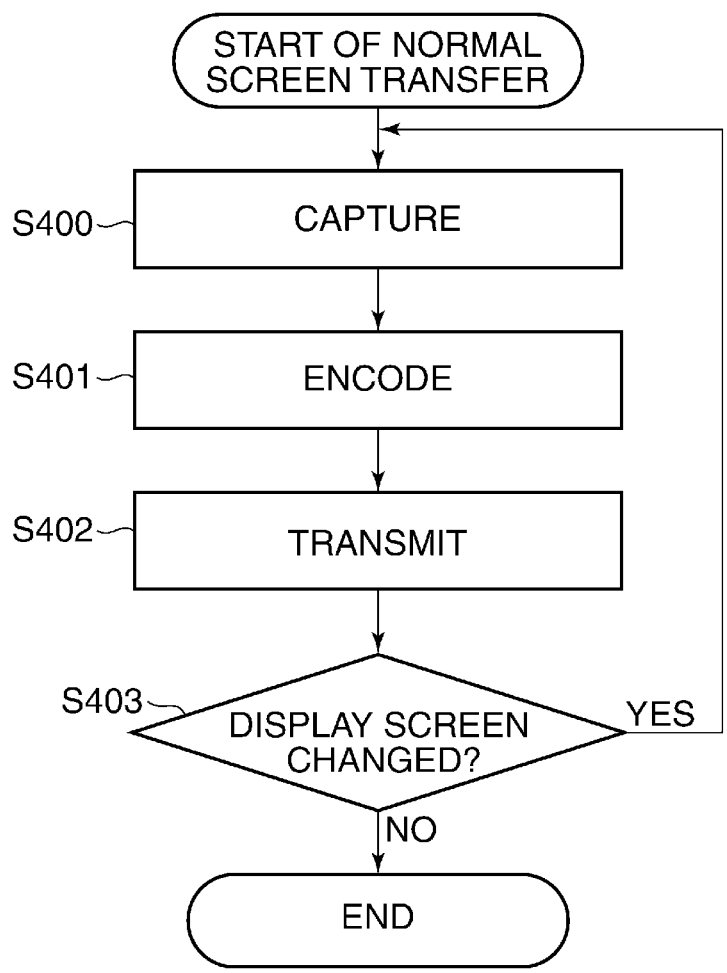
FIG. 4 is a flowchart which is useful in explaining a normal screen transfer process in step S307 in FIG. 3.

FIG. 4 is a flowchart which is useful in explaining the normal screen transfer process in the step S307 in FIG. 3. It should be noted that process in the illustrated flowchart is carried out under the control of the CPU 101.

The CPU 101 starts the normal screen transfer process, and in step S400, captures image data being displayed on the display unit 105 by controlling the display control unit 106, transfers the image data from the VRAM 103 to the RAM 102, and stores the same in the RAM 102. Next, in step S401, the CPU 101 encodes the image data stored in the RAM 102 to obtain encoded image data. Then, the CPU 101 stores the encoded image data in the RAM 102.

Next, in step S402, the CPU 101 transmits the encoded image data stored in the RAM 102 to the projector 1000 as display data using the wireless communication unit 108. Then, in step S403, the CPU 101 determines whether or not a display screen (display data) on the display unit 105 has changed.

When the CPU 101 determines that the display screen has not changed, the normal screen transfer process is terminated. On the other hand, when the CPU 101 determines that the display screen has changed, the process returns to the step S400.

FIG. 5 is a flowchart which is useful in explaining the Web page screen transfer process in the step S303 in FIG. 3. It should be noted that process in the illustrated flowchart is carried out under the control of the CPU 101.

The CPU 101 starts the Web page screen transfer process, and in step S500, captures an area to be sent to the projector 1000, which will be described later, in a Web page rendering result expanded on the RAM 102 as an area to be transferred (a transfer area or a transmission area). Namely, in the step S500, the CPU 101 carries out a process in which it obtains a Web page rendering result from the RAM 102 and obtains only a transfer area thereof. It should be noted that the transfer area means an area to be displayed by the projector 1000.

Next, in step S501, the CPU 101 encodes image data concerning the transfer area to obtain encoded transfer area image data. Then, in step S502, the CPU 101 transmits the encoded transfer area image data to the projector 1000 using the wireless communication unit 108.

Next, in step S503, the CPU 101 compares the transfer area with image data which is a Web page rendering result expanded on the RAM 102 at the time the encoded transfer area image data is transmitted, and based on the comparison result, determines whether or not there has been a change. When the CPU 101 determines that there has been a change in the transfer area and the image data expanded on the RAM 102, the process returns to the step S500. The CPU 101 then captures an area to be transmitted to the projector 1000 in the Web page rendering result expanded on the RAM 102 as a next transfer area. On the other hand, upon determining that there has been no change in the transfer area and the image data expanded on the RAM 102, the CPU 101 terminates the Web page screen transfer process.

Figure 6A:
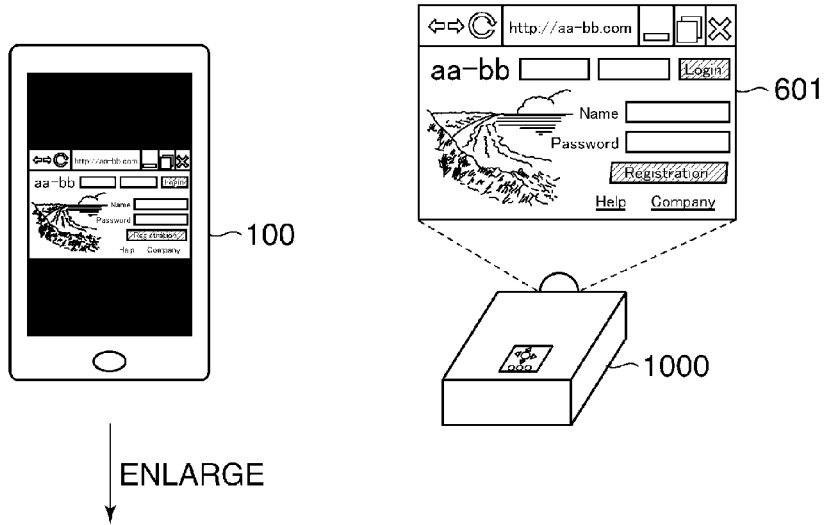
Figure 6B:
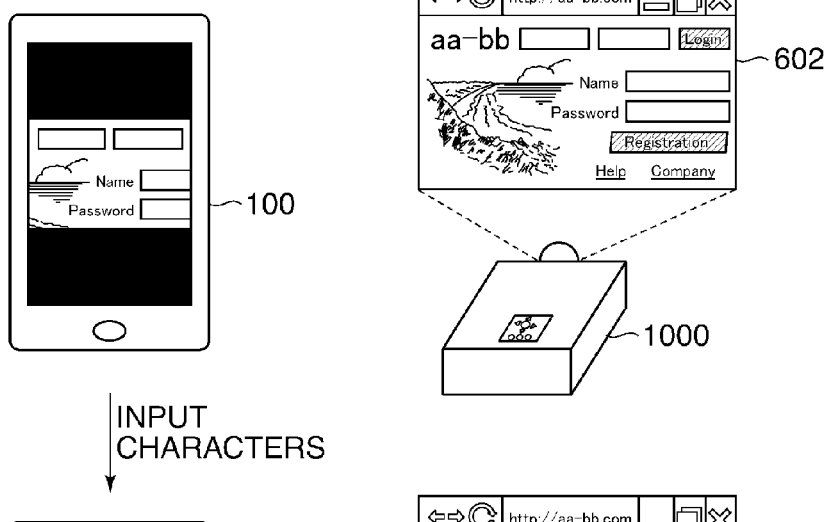
Figure 6C:
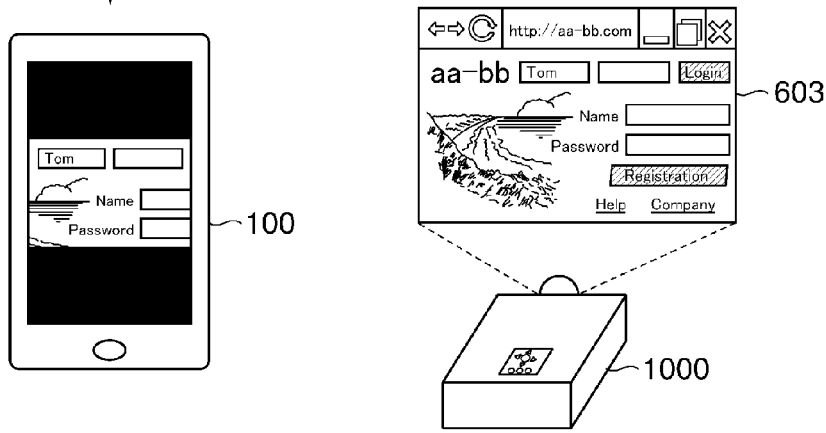
Figure 7:
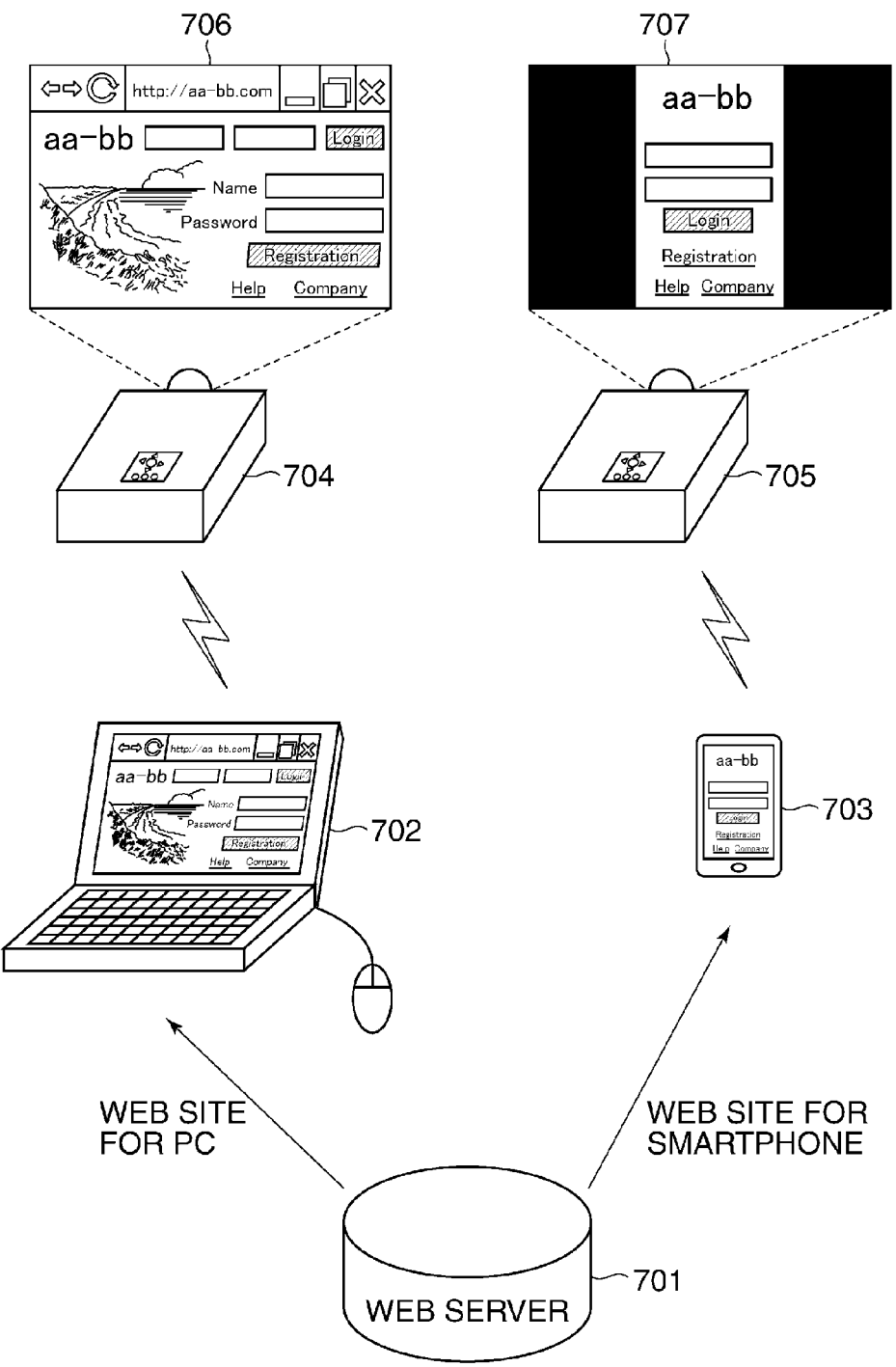
FIG. 7 is a view which is useful in explaining an exemplary conventional screen transfer system.

FIG. 6 is a diagram which is useful in explaining the capturing process in the step S500 in FIG. 5 and the transfer area change determination process in the step S503 in FIG. 5. In the figure, (*a*) shows a state in which the smartphone 100 transfers a Web page for PCs to the projector 1000 and displays the same on the projector 1000, and (*b*) shows an exemplary state after a change in the transfer area. Also, (*c*) in the figure shows another exemplary state after a change in the transfer area.

Now assume that as shown by (*a*) in the figure, the smartphone 100 has obtained a Web page for PCs from the Web server, transfers the Web page to the projector 1000, and displays the Web page as a projection screen 601 on the projector 1000. It is assumed here that the user enlarges the Web page by operating the smartphone 100.

On this occasion, as with the normal screen transfer process described above with reference to FIG. 4, when the CPU 101 determines whether or not there has been a change in the Web page and transfers image data recorded in the VRAM 103 to the projector 1000, the projection screen 601 of the projector 1000 changes. On the other hand, in the step S503 in FIG. 5, as a result of comparison between the transfer area and the image data which is the Web page rendering result expanded on the RAM 102 at the time the image data is sent, the CPU 101 determines that there has been no change in the transfer area (that is, no change in the display range). As a result, as shown by (b) in the figure, a projection screen 602, which is the same as the projection screen 601 shown by (b) in the figure, is displayed by projection on the projector 1000 without being affected by the enlargement of the Web page in the smartphone 100.

It should be noted that the process described above is also applied to a case where a predetermined operation such as reduction or screen scroll as well as enlargement has been performed.

Further, when, for example, the user inputs characters (here, Tom) on the Web page in the smartphone 100, the CPU 101 determines that there has been a change in the transfer area. As a result, as shown by (c) in the figure, a projection screen 603 reflecting character input (here, Tom) is displayed by projection in the projector 1000.

Thus, in the embodiment of the present invention, according to whether or not a content to be transferred to the projector 1000 connected to the smartphone 100 is a Web page, information indicative of a type of a Web page, which is added to a request transmitted to the Web server, is switched. As a result, a Web page can be transferred and displayed by projection in the projector 1000.

In the embodiment described above, Web page obtainment modes are changed as in the step S302 in FIG. 3 described above on the condition that a wireless connection with the projector 1000 is established. However, the condition that the resolution of the projector 1000 connected to the smartphone 100 is equal to or higher than a resolution prescribed in advance may be added. In this case, a Web page for smartphones is transferred to the projector 1000 when the resolution of the projector 1000 is lower than the resolution prescribed in advance. Namely, a Web page appropriate to performance of the projector 1000 is transferred to the projector 1000 and displayed by projection.

Alternatively, the condition that a size of an image that can be displayed by the projector 1000 connected to the smartphone 100 (display size) is equal to or greater than a size prescribed in advance may be added. In this case, the smartphone 100 receives display capability data including information on the display size from the projector 1000 and refers to the display capability data to determine whether or not the display size of the projector 1000 is equal to or greater than the size prescribed in advance.

Here, when it is determined that the display size of the projector 1000 is smaller than the size prescribed in advance, a Web page for smartphones is transferred to the projector 1000. Namely, when it is determined that the display size of the projector 1000 is smaller than the size prescribed in advance, type information indicative of a Web browser for smartphones is stored in a User-Agent header of an HTTP GET request (HTTP request) which is transmitted from the smartphone 100 to the Web server.

When a state of projection by the projector 1000 is such a display mode as PinP or PbyP, the size of a display area for displaying image data transferred from the smartphone 100 is small. Thus, in this case, Web page obtainment modes may not be changed as described above in the smartphone 100. As a result, when a state of projection on the projector 1000 is such a display mode as PinP or PbyP, a Web page for smartphones is projected by the projector 1000, so that the Web page can be displayed by projection making effective use of a projection surface.

It should be noted that when an area where image data transferred from the smartphone 100 is projected is sufficiently large, the smartphone 100 may change Web page obtainment modes, causing the projector 1000 to display a Web page for PCs by projection.

As described above, when a state of projection by the projector 1000 is such a display mode as PinP or PbyP, the projector 1000 displays a Web page for smartphones by projection. Assume here that the display mode is restored to the normal display mode by canceling the display mode PinP or PbyP, and a Web page to be obtained by the smartphone 100 is switched to a Web page for PCs. In this case, when a Web page for PCs is projection-displayed the projector 1000 in a state in which a Web page for smartphones has been displayed by projection until now, it is difficult for a user who is seeing a projection surface to determine whether or not contents of the Web pages displayed before and after switching of the Web pages are the same. Therefore, when the display mode of the projector 1000 is restored from the display mode such as PinP or PbyP to the normal display mode, the smartphone 100 may not obtain a Web page for PCs again.

Likewise, when the display mode of the projector 1000 which displays a Web page for PCs by projection is changed from the normal display mode to PinP or PbyP, the smartphone 100 may not obtain a Web page for smartphones again.

In the present embodiment described above, a smartphone is taken as an example of the information processing apparatus. The information processing apparatus, however, is not limited to this. Any information processing apparatus such as a mobile terminal (for example, a tablet PC) other than a smartphone may be adopted as long as it has a Web browser function and a screen transfer function.

Moreover, in the present embodiment described above, a projector is taken as an example of the external display device. The external display device, however, is not limited to this. Any device such as a television, a PC monitor, or a notebook PC may be adopted as the external display device as long as it is able to receive image data from the information processing apparatus and output the same.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-212078, filed Oct. 9, 2013, which is hereby incorporated by reference herein in its entirety.

What is claimed is:

1. An information processing apparatus which is a mobile device connectable to an external display device, comprising:
   a requesting unit configured to request, from a server configured to send one or more of a plurality of contents including a first content and a second content differing in an amount of information and associated with each other, the second content being larger than the first content in the amount of information, a particular one of the plurality of contents;
   a receiving unit configured to receive the particular one of the plurality of contents transmitted from the server in response to the request from the requesting unit;
   a display unit configured to display the particular one of the plurality of contents received by the receiving unit;
   a transmission unit configured to transmit display data based on the particular one of the plurality of contents received by the receiving unit to the external display device, wherein,
      in a case where the particular one of the plurality of contents is requested from the server in a state in which the information processing apparatus is not connected to the external display device, the requesting unit is configured to request the server to send the first content,
      in a case where the particular one of the plurality of contents is requested from the server in a state in which the information processing apparatus is connected to the external display device, the requesting unit is configured to not request the server to send the first content, and
      in a case where a state of connection with the external display device changes while the particular one of the plurality of contents received from the server is being displayed on said display unit, the requesting unit is configured to request another one of the plurality of contents from the server again, and in accordance with the state of connection after the change, determine whether to request the server to send the first content.

2. The information processing apparatus according to claim 1, wherein the requesting unit is configured to request the server to send another one of the plurality of contents in a case where a connection with the external display device is terminated or established.

3. The information processing apparatus according to claim 1, wherein the same wireless standards are used in at least part of communication with the external display device and communication with the server.

4. The information processing apparatus according to claim 1, wherein different wireless standards are used in communication with the external display device and communication with the server.

5. The information processing apparatus according to claim 1, wherein the requesting unit is configured to request the server to send the second content in a state in which the external display device is connected to the information processing apparatus.

6. The information processing apparatus according to claim 1, wherein in a case where a display capability of the connected external display device is lower than a predetermined capability, the requesting unit is configured to request the server to send the first content.

7. The information processing apparatus according to claim 1, wherein the requesting unit is configured to determine whether to request the server to send the first content based on a display mode of the external display device.

8. The information processing apparatus according to claim 7, wherein in a case where the display mode of the external display device has changed, the requesting unit is configured to request the server to send the first content based on the display mode after the change.

9. An information processing apparatus which is a mobile device connectable to an external display device, comprising:
   a requesting unit configured to request, from a server configured to send one or more of a plurality of contents including a first content and a second content differing in a display layout and associated with each other, a particular one of the plurality of contents;
   a receiving unit configured to receive the particular one of the plurality of contents transmitted from the server in response to the request from the requesting unit;
   a display unit configured to display the particular one of the plurality of contents received by the receiving unit;
   a transmission unit configured to transmit display data based on the particular one of the plurality of contents received by the receiving unit to the external display device, wherein,
      in a case where the particular one of the plurality of contents is requested from the server in a state in which the information processing apparatus is not connected to the external display device, the requesting unit is configured to request the server to send the first content,
      in a case where the particular one of the plurality of contents is requested from the server in a state in which the information processing apparatus is connected to the external display device, the requesting unit is configured to request the server to send the second content,
      in a case where a state of connection with the external display device changes, the requesting unit is configured to request another one of the plurality of contents from the server again, and in accordance with the state of connection after the change, determine whether to request the server to send the first content or the second content.

10. A control method for an information processing apparatus which is a mobile device connectable to an external display device, comprising:
    a requesting step of requesting, from a server configured to send one or more of a plurality of contents including a first content and a second content differing in an amount of information and associated with each other, the second content being larger than the first content in the amount of information, a particular one of the plurality of contents;
    a receiving step of receiving the particular one of the plurality of contents transmitted from the server in response to the request from the requesting unit;
    a display step of displaying the particular one of the plurality of contents received by the receiving unit;
    a transmission step of transmitting display data based on the particular one of the plurality of contents received by the receiving unit to the external display device, wherein,
       in a case where the particular one of the plurality of contents is requested from the server in a state in which the information processing apparatus is not connected to the external display device, the requesting unit is configured to request the server to send the first content, in a case where the particular one of the plurality of contents is requested from the server in a state in which the information processing apparatus is connected to the external display device, the requesting unit is configured to not request the server to send the first content, and in a case where a state of connection with the external display device changes while the particular one of the plurality of contents received from the server is being displayed on said display unit, the requesting unit is configured to request another one of the plurality of contents from the server again, and in accordance with the state of connection after the change, determine whether to request the server to send the first content.

11. A non-transitory computer-readable storage medium storing a program for causing a computer to execute a control method for an information processing apparatus which is a mobile device connectable to an external display device, the control method comprising:

a requesting step of requesting, from a server configured to send one or more of a plurality of contents including a first content and a second content differing in an amount of information and associated with each other, the second content being larger than the first content in the amount of information, a particular one of the plurality of contents;

a receiving step of receiving the particular one of the plurality of contents transmitted from the server in response to the request from the requesting unit;

a display step of displaying the particular one of the plurality of contents received by the receiving unit;

a transmission step of transmitting display data based on the particular one of the plurality of contents received by the receiving unit to the external display device, wherein, in a case where the particular one of the plurality of contents is requested from the server in a state in which the information processing apparatus is not connected to the external display device, the requesting unit is configured to request the server to send the first content, in a case where the particular one of the plurality of contents is requested from the server in a state in which the information processing apparatus is connected to the external display device, the requesting unit is configured to not request the server to send the first content, and in a case where a state of connection with the external display device changes while the particular one of the plurality of contents received from the server is being displayed on said display unit, the requesting unit is configured to request another one of the plurality of contents from the server again, and in accordance with the state of connection after the change, determine whether to request the server to send the first content.

12. A control method for an information processing apparatus which is a mobile device connectable to an external display device, comprising:

a requesting step of requesting, from a server configured to send one or more of a plurality of contents including a first content and a second content differing in a display layout and associated with each other, a particular one of the plurality of contents;

a receiving step of receiving the particular one of the plurality of contents transmitted from the server in response to the request from the requesting unit;

a display step of displaying the particular one of the plurality of contents received by the receiving unit;

a transmission step of transmitting display data based on the particular one of the plurality of contents received by the receiving unit to the external display device, wherein, in a case where the particular one of the plurality of contents is requested from the server in a state in which the information processing apparatus is not connected to the external display device, the requesting unit is configured to request the server to send the first content, in a case where the particular one of the plurality of contents is requested from the server in a state in which the information processing apparatus is connected to the external display device, the requesting unit is configured to request the server to send the second content, in a case where a state of connection with the external display device changes, the requesting unit is configured to request another one of the plurality of contents from the server again, and in accordance with the state of connection after the change, determine whether to request the server to send the first content or the second content.

13. A non-transitory computer-readable storage medium storing a program for causing a computer to execute a control method for an information processing apparatus which is a mobile device connectable to an external display device, the control method comprising:

a requesting step of requesting, from a server configured to send one or more of a plurality of contents including a first content and a second content differing in a display layout and associated with each other, a particular one of the plurality of contents;

a receiving step of receiving the particular one of the plurality of contents transmitted from the server in response to the request from the requesting unit;

a display step of displaying the particular one of the plurality of contents received by the receiving unit;

a transmission step of transmitting display data based on the particular one of the plurality of contents received by the receiving unit to the external display device, wherein, in a case where the particular one of the plurality of contents is requested from the server in a state in which the information processing apparatus is not connected to the external display device, the requesting unit is configured to request the server to send the first content, in a case where the particular one of the plurality of contents is requested from the server in a state in which the information processing apparatus is connected to the external display device, the requesting unit is configured to request the server to send the second content, in a case where a state of connection with the external display device changes, the requesting unit is configured to request another one of the plurality of contents from the server again, and in accordance with the state of connection after the change, determine whether to request the server to send the first content or the second content.

* * * * *